(12) United States Patent
Xia et al.

(10) Patent No.: US 12,526,043 B2
(45) Date of Patent: Jan. 13, 2026

(54) SYSTEMS AND METHODS FOR DISTRIBUTED FIBER SENSING FOR ULTRA-LONG-HAUL TRANSPORT NETWORKS

(71) Applicant: Verizon Patent and Licensing Inc., Basking Ridge, NJ (US)

(72) Inventors: Tiejun J. Xia, Richardson, TX (US); Glenn A. Wellbrock, Wichita, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 18/447,123

(22) Filed: Aug. 9, 2023

(65) Prior Publication Data

US 2025/0055563 A1   Feb. 13, 2025

(51) Int. Cl.
*H04B 10/071* (2013.01)
*H04B 10/079* (2013.01)

(52) U.S. Cl.
CPC ....... *H04B 10/071* (2013.01); *H04B 10/0791* (2013.01)

(58) Field of Classification Search
CPC ............................................ H04B 10/07–0799
See application file for complete search history.

(56) References Cited

U.S. PATENT DOCUMENTS

| | | | | |
|---|---|---|---|---|
| 11,671,172 B1 * | 6/2023 | Jiang | .................. | G01M 11/3145 398/16 |
| 2004/0047629 A1 * | 3/2004 | Evangelides, Jr. | .. | H04B 10/071 398/33 |
| 2010/0150547 A1 * | 6/2010 | Xia | ...................... | H04B 10/071 398/79 |
| 2016/0197673 A1 * | 7/2016 | McClean | ........... | G01M 11/3154 398/38 |
| 2022/0006524 A1 * | 1/2022 | Nakano | .............. | G01M 11/3145 |
| 2023/0388012 A1 * | 11/2023 | Brenne | .................. | G01V 1/226 |
| 2024/0077382 A1 * | 3/2024 | Guo | ................... | G01M 11/3127 |

\* cited by examiner

*Primary Examiner* — Nathan M Cors (57) ABSTRACT

A device may provide a first optical signal to a destination terminal via a fiber cable and a plurality of sensing repeaters provided at intermediate sites of an ultra-long-haul transport network. The device may receive a second optical signal, based on the first optical signal, via the fiber cable and the plurality of sensing repeaters provided at the intermediate sites of the ultra-long-haul transport network. The device may determine whether the fiber cable has an issue based on the second optical signal, and may perform one or more actions based on whether the fiber cable has an issue.

20 Claims, 9 Drawing Sheets

SYSTEMS AND METHODS FOR DISTRIBUTED FIBER SENSING FOR ULTRA-LONG-HAUL TRANSPORT NETWORKS

BACKGROUND

Ultra-long-haul transport networks (e.g., optical fiber networks) may connect cities and countries throughout the world. Today, these networks typically range from a few hundred to several thousand kilometers and have largely migrated to 100G-based dense wavelength division multiplexing (DWDM) systems with eighty channels or more.

DETAILED DESCRIPTION OF EXAMPLE EMBODIMENTS

The following detailed description of example implementations refers to the accompanying drawings. The same reference numbers in different drawings may identify the same or similar elements.

Currently, all distributed fiber sensing methods that are based on Rayleigh back scattering are for a single fiber span only because a sensing signal which travels in the opposite direction of a transmission signal is not able to pass through normal optical amplifiers (e.g., since they contain isolators). An ultra-long-haul fiber network cable requires several optical amplifiers (e.g., at each segment of the network) in order to transmit the transmission signal through the network. Therefore, for an ultra-long-haul fiber network cable, expensive fiber sensing equipment is needed for each segment of the network. Longer ultra-long-haul fiber network cables require more segments and more fiber sensing equipment, which further increases the costs of monitoring such ultra-long-haul fiber network cables. Thus, current techniques for monitoring ultra-long-haul fiber network cables consume computing resources (e.g., processing resources, memory resources, communication resources, and/or the like), networking resources, and/or other resources associated with requiring fiber sensing equipment for each segment of the ultra-long-haul fiber network, managing the large quantity of fiber sensing equipment for the ultra-long-haul fiber network, maintaining the large quantity of fiber sensing equipment for the ultra-long-haul fiber network, and/or the like.

Some implementations described herein relate to distributed fiber sensing for ultra-long-haul transport networks. For example, a sensor device may provide a first optical signal to a destination terminal via a fiber cable and a plurality of sensing repeaters provided at intermediate sites of an ultra-long-haul transport network. The sensor device may receive a second optical signal, based on the first optical signal, via the fiber cable and the plurality of sensing repeaters provided at the intermediate sites of the ultra-long-haul transport network. The sensor device may determine whether the fiber cable has an issue based on the second optical signal, and may perform one or more actions based on whether the fiber cable has an issue.

In this way, the sensor device provides distributed fiber sensing for ultra-long-haul transport networks. For example, the sensor device may be associated with an ultra-long-haul (ULH) transport fiber cable, which may contain many fiber spans. The sensor device may provide a transmission signal to a destination terminal, via the ULH transport fiber cable and multiple sensing repeaters provided at intermediate sites of an ultra-long-haul fiber network. The sensing repeaters may be much more cost effective as compared to fiber sensing equipment, and may provide the transmission signal to the destination terminal. The sensing repeaters may receive a sensing signal in response to the transmission signal, may compensate for loss of the sensing signal, and may provide the sensing signal back to the sensor device. The sensor device may determine whether the ULH transport fiber cable has an issue based on the second optical signal. Thus, the sensor device may conserve computing resources, networking resources, and/or other resources that would have otherwise been consumed by requiring fiber sensing equipment for each segment of the ultra-long-haul fiber network, managing the large quantity of fiber sensing equipment for the ultra-long-haul fiber network, maintaining the large quantity of fiber sensing equipment for the ultra-long-haul fiber network, and/or the like.

FIGS. 1A-1F are diagrams of an example 100 associated with distributed fiber sensing for ultra-long-haul transport networks. As shown in FIGS. 1A-1F, example 100 includes an ultra-long-haul transport network with a two ULH terminals, a sensor device 105 provided in one of the ULH terminals, multiple intermediate sites with sensing repeaters 110, and a fiber cable interconnecting the two ULH terminals and the multiple intermediate sites. Further details of ULH terminals, the sensor device 105, the intermediate sites, the sensing repeaters 110, and the fiber cable are provided elsewhere herein.

Figure 1A:
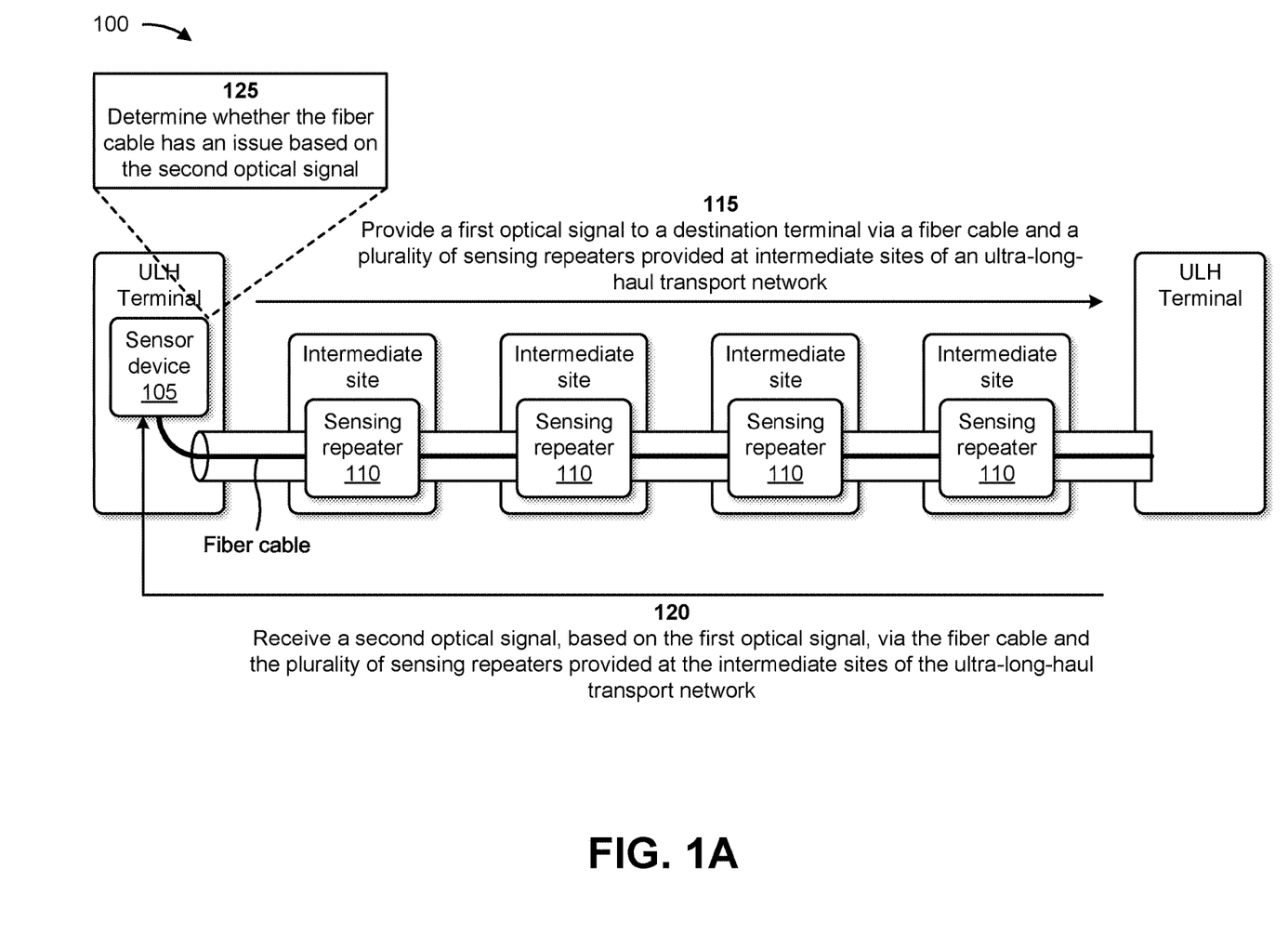
FIGS. 1A-1F are diagrams of an example associated with distributed fiber sensing for ultra-long-haul transport networks.

As shown in FIG. 1A, the ULH terminal with the sensor device 105 may be an origination ULH terminal and the other ULH terminal may be a destination ULH terminal. The ULH terminals may be interconnected via the fiber cable and the intermediate sites with the sensing repeaters 110. The sensing repeaters 110 may compensate for loss of a sensing signal for each span of the fiber cable between the intermediate sites, and may provide the sensing signal back to the sensor device 105. The sensing repeaters 110 may be much less expensive than fiber sensing equipment currently provided in intermediate sites and may eliminate the issue associated with sensing signal blockage due to isolators of optical amplifiers. In some implementations, each of the sensing repeaters 110 may include a Raman amplifier that compensates for loss in a sensing signal for each span of the fiber cable. In some implementations, the fiber cable may be a single dark fiber utilized for detecting any issues associated with the ultra-long-haul transport network.

As further shown in FIG. 1A, and by reference number 115, the sensor device 105 may provide a first optical signal to the destination ULH terminal via the fiber cable and the plurality of the sensing repeaters 110 provided at the intermediate sites of the ultra-long-haul transport network. For example, the sensor device 105 may include a laser pulse generator that generates a first optical signal (e.g., a transmission signal) destined for the destination ULH terminal. The sensor device 105 may provide the first optical signal to the fiber cable and the fiber cable may provide the first optical signal to the destination ULH terminal via the multiple intermediate sites. Each intermediate site and each sensing repeater 110 may receive the first optical signal and may provide the first optical signal to a next intermediate site (e.g., and sensing repeater 110) until the first optical signal reaches the destination ULH terminal.

As further shown in FIG. 1A, and by reference number 120, the sensor device 105 may receive a second optical signal, based on the first optical signal, via the fiber cable and the plurality of sensing repeaters 110 provided at the intermediate sites of the ultra-long-haul transport network. For example, once the first optical signal reaches the destination ULH terminal, the first optical signal may be (at least partially) reflected back to the origination ULH terminal and the sensor device 105 as the second optical signal. The second optical signal may be provided to the fiber cable and the fiber cable may provide the second optical signal to the origination ULH terminal via the multiple intermediate sites. Each intermediate site and each sensing repeater 110 may receive the second optical signal and may provide the second optical signal to a next intermediate site (e.g., and sensing repeater 110) until the second optical signal reaches the origination ULH terminal.

As further shown in FIG. 1A, and by reference number 125, the sensor device 105 may determine whether the fiber cable has an issue based on the second optical signal. For example, the sensor device 105 may determine whether the fiber cable and/or the ultra-long-haul transport network has any issues based on the second optical signal. The sensor device 105 may include a signal detection and processing component, such as a distributed optical fiber sensing device (e.g., a Rayleigh scattering based distributed optical fiber acoustic sensing device), an optical reflectometry device (e.g., an optical time-domain reflectometry (OTDR) device), a computer, and/or the like. The sensor device 105 may detect (using the distributed optical sensing device) the second optical signal reflected back from the destination ULH terminal to the sensor device 105, and may compare the second optical signal and the first optical signal. The sensor device 105 may determine whether the fiber cable has an issue based on comparing the second optical signal and the first optical signal. For example, if the second optical signal is deteriorated compared to the first optical signal, the sensor device 105 may determine that the fiber cable, one of the intermediate sites, the destination ULH terminal, and/or the like has an issue (e.g., a partial break in the fiber cable, an optical device issue at one of the intermediate sites, and/or the like).

In some implementations, the sensor device 105 may perform one or more actions based on determining whether the fiber cable has an issue. For example, when performing the one or more actions, the sensor device 105 may identify a location of an issue associated with the fiber cable and may provide an alert associated with the location of the issue. In another example, when performing the one or more actions, the sensor device may identify an issue associated with the fiber cable at one of the intermediate sites, and may provide an alert associated with the one of the intermediate sites.

Figure 1B:
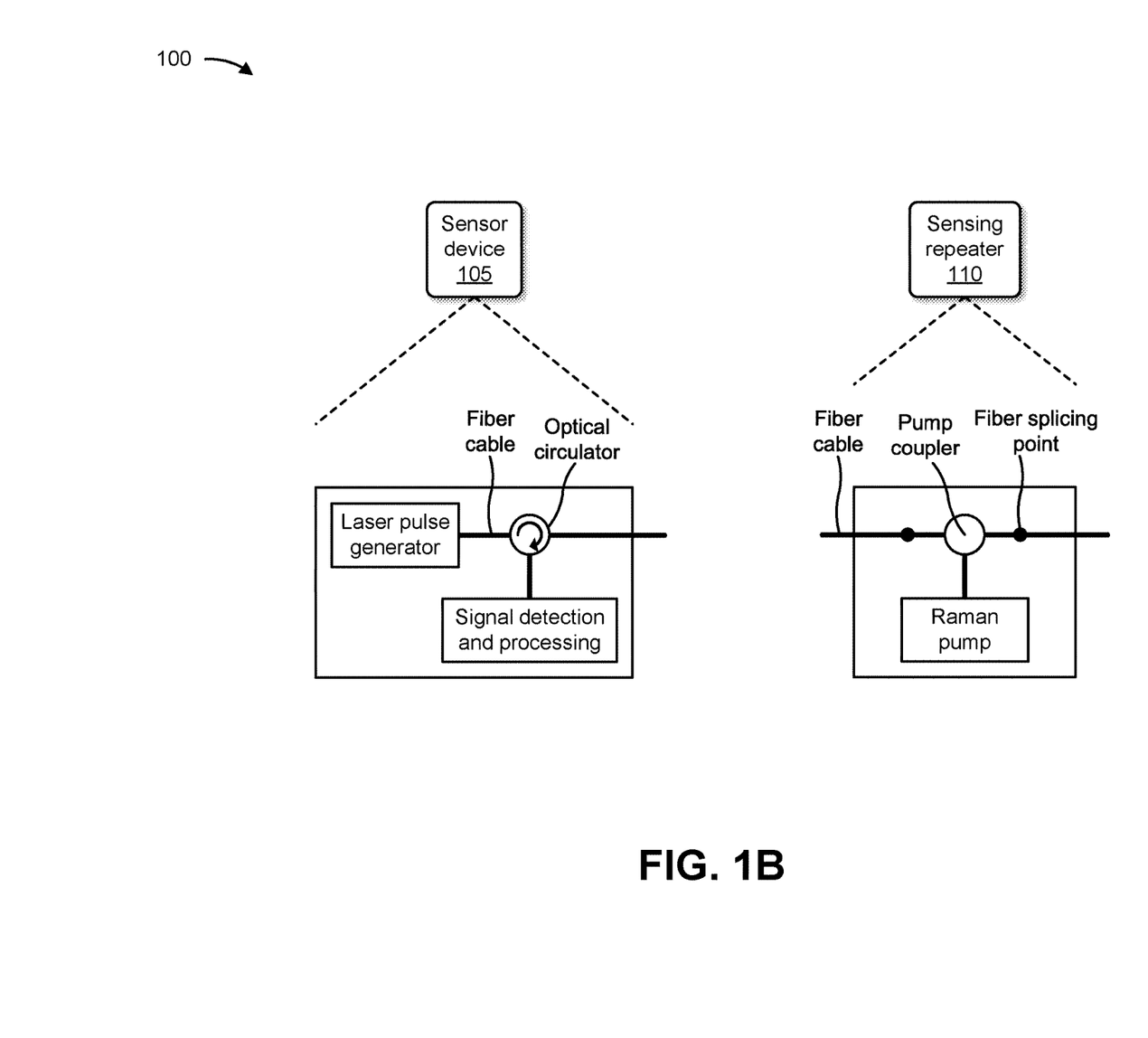

FIG. 1B depicts components of the sensor device 105 and components of the sensing repeater 110. As shown, the sensor device 105 may include a laser pulse generator, a signal detection and processing component, and an optical circulator. In some implementations, the laser pulse generator may be configured to generate the first optical signal and provide the first optical signal to the destination ULH terminal via the fiber cable and the plurality of sensing repeaters 110 provided at the intermediate sites of the ultra-long-haul transport network. The signal detection and processing component may be configured to receive the second optical signal, based on the first optical signal, via the fiber cable and the plurality of sensing repeaters 110 provided at the intermediate sites of the ultra-long-haul transport network. The signal detection and processing component may also be configured to determine whether the fiber cable has an issue based on the second optical signal, and perform the one or more actions based on whether the fiber cable has an issue. The optical circulator may be configured to provide the first optical signal to the destination ULH terminal, and receive the second optical signal. The optical circulator may also be configured to provide the second optical signal to the signal detection and processing component.

As further shown in FIG. 1B, the sensing repeater 110 may include a Raman pump and a pump coupler. The Raman pump may include a Raman amplifier that utilizes stimulated Raman scattering (SRS) within the fiber cable, which transfers energy of higher-frequency pump signals to lower-frequency signals. The amplification may occur along the fiber cable for a distributed Raman amplifier. The pump coupler may be configured to receive the energy generated by the Raman pump and to utilize the energy to amplify the first optical signal and/or the second optical signal.

Figure 1C:
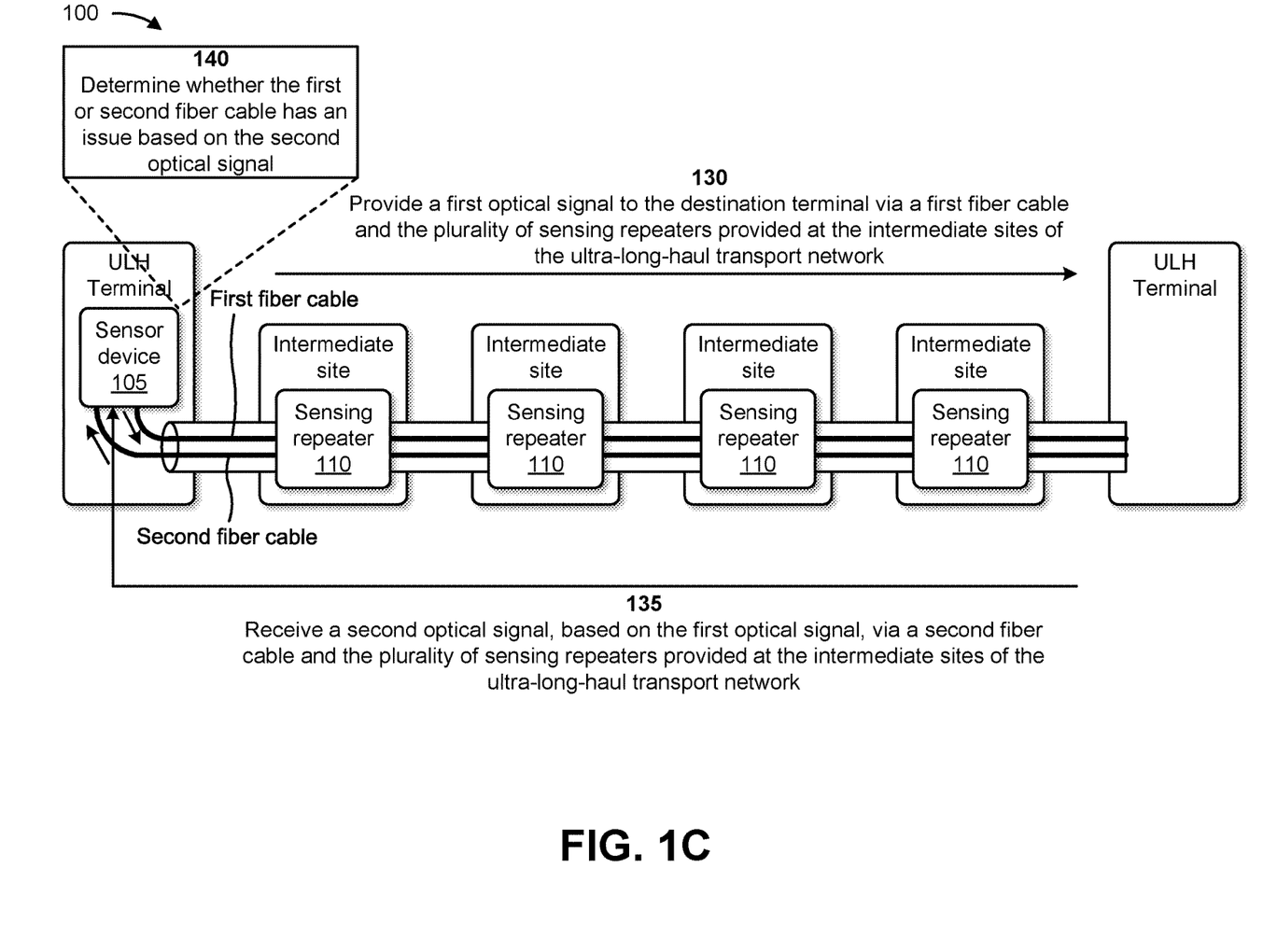

The configuration depicted in FIG. 1C may be the same as the configuration depicted in FIG. 1A, except that the fiber cable is replaced with a pair of fiber cables (e.g., a first fiber cable and a second fiber cable). In such a configuration, the first optical signal may be provided to the destination ULH terminal via the first fiber cable, and the second optical signal may be received via the second fiber cable.

As further shown in FIG. 1C, and by reference number 130, the sensor device 105 may provide a first optical signal to the destination ULH terminal via a first fiber cable and the plurality of sensing repeaters provided at the intermediate sites of the ultra-long-haul transport network. For example, the laser pulse generator of the sensor device 105 may generate the first optical signal (e.g., a transmission signal) destined for the destination ULH terminal. The sensor device 105 may provide the first optical signal to the first fiber cable and the first fiber cable may provide the first optical signal to the destination ULH terminal via the multiple intermediate sites. Each intermediate site and each sensing repeater 110 may receive the first optical signal and may provide the first optical signal to a next intermediate site (e.g., and sensing repeater 110) until the first optical signal reaches the destination ULH terminal.

As further shown in FIG. 1C, and by reference number 135, the sensor device 105 may receive a second optical signal, based on the first optical signal, via the second fiber cable and the plurality of sensing repeaters 110 provided at the intermediate sites of the ultra-long-haul transport network. For example, once the first optical signal reaches the destination ULH terminal, the first optical signal may be (at least partially) reflected back to the origination ULH terminal and the sensor device 105 as the second optical signal. The second optical signal may be provided to the second fiber cable and the second fiber cable may provide the second optical signal to the origination ULH terminal via the multiple intermediate sites. Each intermediate site and each sensing repeater 110 may receive the second optical signal and may provide the second optical signal to a next intermediate site (e.g., and sensing repeater 110) until the second optical signal reaches the origination ULH terminal.

As further shown in FIG. 1C, and by reference number 140, the sensor device 105 may determine whether the first fiber cable or the second fiber cable has an issue based on the second optical signal. For example, the sensor device 105 may determine whether the first fiber cable, the second fiber cable, and/or the ultra-long-haul transport network has any issues based on the second optical signal. The signal detection and processing component of the sensor device 105 may detect (using the distributed optical sensing device), the second optical signal reflected back from the destination ULH terminal to the sensor device 105 and may compare the second optical signal and the first optical signal. The sensor device 105 may determine whether the first fiber cable or the second fiber cable has an issue based on comparing the second optical signal and the first optical signal. For example, if the second optical signal is deteriorated compared to the first optical signal, the sensor device 105 may determine that the first fiber cable, the second fiber cable, one of the intermediate sites, the destination ULH terminal, and/or the like has an issue (e.g., a partial break in the first fiber cable or the second fiber cable, an optical device issue at one of the intermediate sites, and/or the like).

In some implementations, the sensor device 105 may perform one or more actions based on determining whether the first fiber cable or the second fiber cable has an issue. For example, when performing the one or more actions, the sensor device 105 may identify a location of an issue associated with the first fiber cable or the second fiber cable and may provide an alert associated with the location of the issue. In another example, when performing the one or more actions, the sensor device may identify an issue associated with the first fiber cable or the second fiber cable at one of the intermediate sites, and may provide an alert associated with the one of the intermediate sites.

Figure 1D:
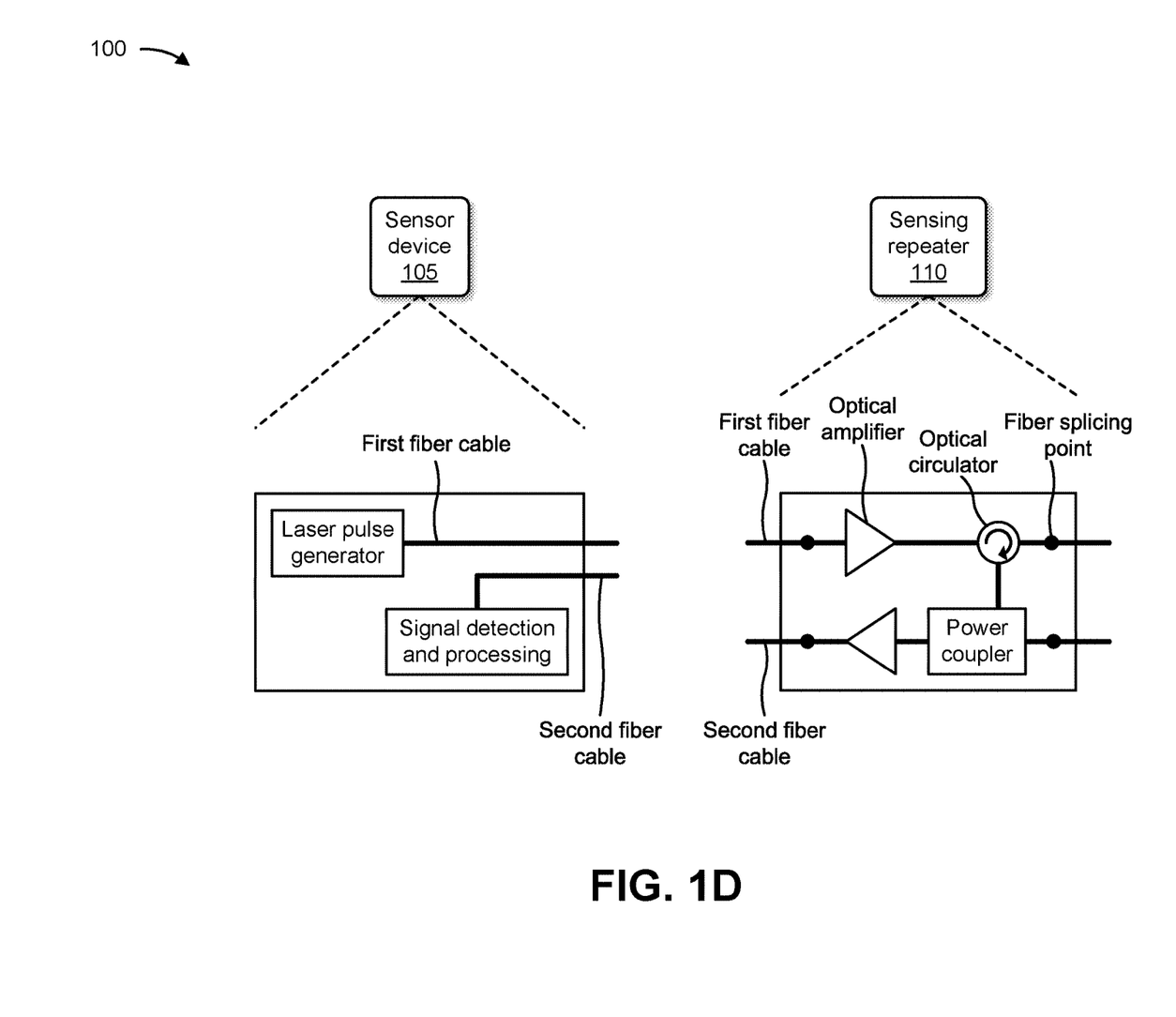

FIG. 1D depicts components of the sensor device 105 and components of the sensing repeater 110. As shown, the sensor device 105 may include the laser pulse generator and the signal detection and processing component. The laser pulse generator may be associated with the first fiber cable and may include the features described above in connection with FIG. 1B. The signal detection and processing component may be associated with the second fiber cable and may include the features described above in connection with FIG. 1B.

The sensing repeater 110 may include a first optical amplifier and an optical circulator associated with the first fiber cable, and may include a power coupler and a second optical amplifier associated with the second fiber cable. The first optical amplifier may be configured to receive, via the first fiber cable, the first optical signal generated by the sensor device 105 provided at the origination ULH terminal of the ultra-long-haul transport network and destined for the destination ULH terminal of the ultra-long-haul transport network. The first optical amplifier may also be configured to amplify the first optical signal. The optical circulator may be configured to receive the amplified first optical signal and provide the amplified first optical signal toward the destination ULH terminal. The power coupler may be configured to receive, via the second fiber cable, the second optical signal provided by the destination ULH terminal, and to receive a portion of the amplified first optical signal from the optical circulator. The power coupler may also be configured to utilize the portion of the amplified first optical signal to modify the second optical signal. The amplified first optical signal may not overlap with the second optical signal since there is a time difference between the signals. The time difference may enable the sensor device 105 to determine a location of an issue (if any). The second optical amplifier may be configured to receive the modified second optical signal, and amplify the modified second optical signal to generate an amplified second optical signal. The second optical amplifier may also be configured to provide the amplified second optical signal toward the sensor device 105.

Figure 1E:
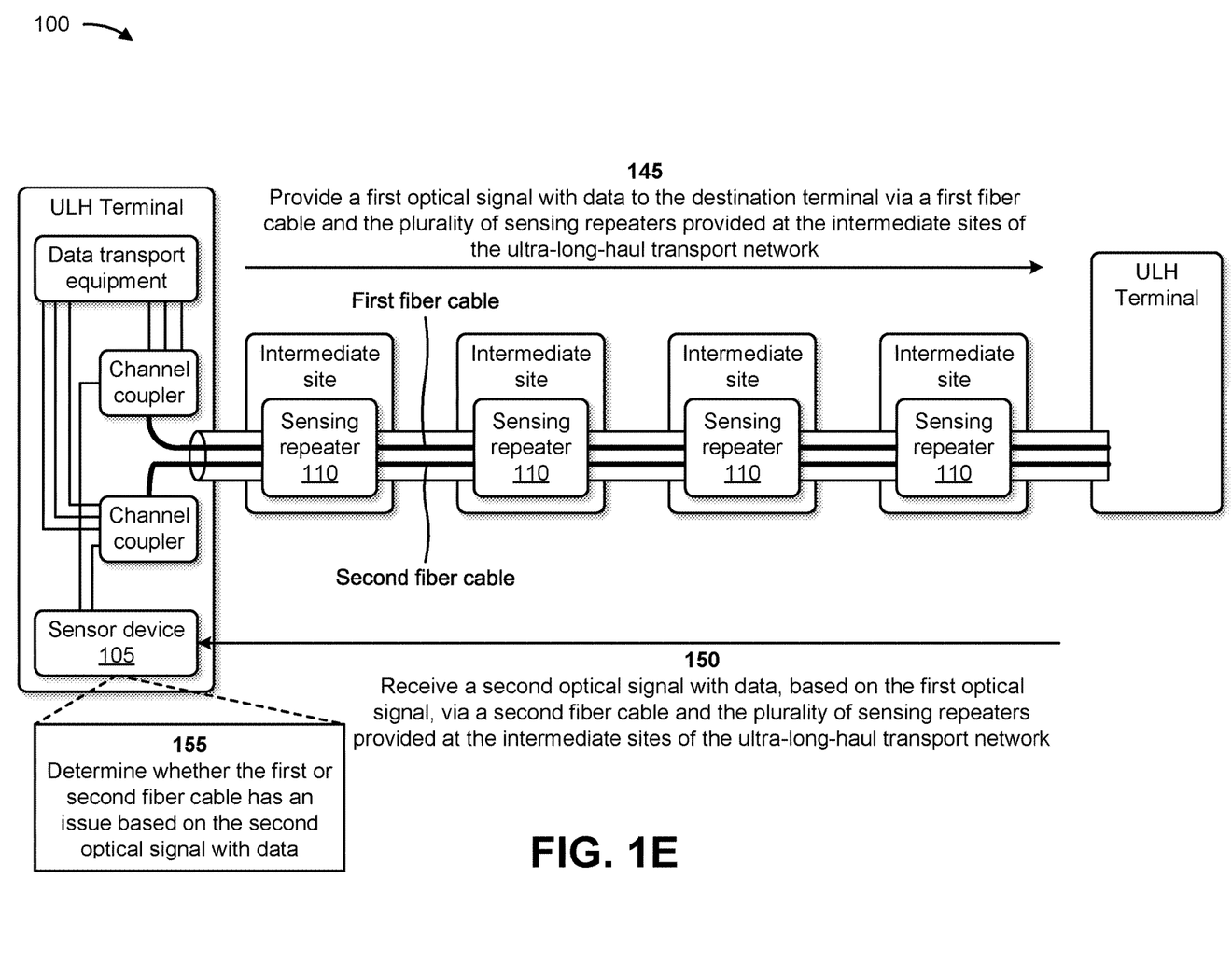

The configuration depicted in FIG. 1E may be the same as the configuration depicted in FIG. 1C, except that the first optical signal may include data to be provided to the destination ULH terminal via the first fiber cable, and the second optical signal may include data to be received via the second fiber cable. The origination ULH terminal may include data transport equipment, a first channel coupler, and a second channel coupler. The data transport equipment may generate data signals and may provide the data signals to multiple channels. The first channel coupler may receive the data signals from the multiple channels and may receive the first optical signal from the sensor device 105. The first channel coupler may combine the data signals and the first optical signal into the first optical signal with data. The first channel coupler may provide the first optical signal with data to the first fiber cable. The second channel coupler may receive a second optical signal with data from the second fiber cable and may divide the second optical signal data into data signals and the second optical signal. The second channel coupler may provide the data signals to the data transport equipment via the multiple channels and may provide the second optical signal to the sensor device 105.

As further shown in FIG. 1E, and by reference number 145, the sensor device 105 may provide the first optical signal with data to the destination terminal via the first fiber cable and the plurality of sensing repeaters 110 provided at the intermediate sites of the ultra-long-haul transport network. For example, the laser pulse generator of the sensor device 105 may generate the first optical signal (e.g., a transmission signal) destined for the destination ULH terminal. The sensor device 105 may provide the first optical signal to the first channel coupler, and the first channel coupler may combine the first optical signal with the data signals to generate the first optical signal with data. The first channel coupler may provide the first optical signal with data to the first fiber cable and the first fiber cable may provide the first optical signal with data to the destination ULH terminal via the multiple intermediate sites. Each intermediate site and each sensing repeater 110 may receive the first optical signal with data and may provide the first optical with data to a next intermediate site (e.g., and sensing repeater 110) until the first optical signal data reaches the destination ULH terminal.

As further shown in FIG. 1E, and by reference number 150, the sensor device 105 may receive a second optical signal with data, based on the first optical signal, via a second fiber cable and the plurality of sensing repeaters provided at the intermediate sites of the ultra-long-haul transport network. For example, once the first optical signal with data reaches the destination ULH terminal, the first optical signal with data may be (at least partially) reflected back to the origination ULH terminal and the sensor device 105 as the second optical signal with data. The destination ULH terminal may also include a first channel coupler and a second channel coupler that perform functions similar to the first channel coupler and the second channel coupler of the origination ULH terminal. The second optical signal with data may be provided to the second fiber cable and the second fiber cable may provide the second optical signal with data to the origination ULH terminal via the multiple intermediate sites. Each intermediate site and each sensing repeater 110 may receive the second optical signal with data and may provide the second optical signal with data to a next intermediate site (e.g., and sensing repeater 110) until the second optical signal with data reaches the origination ULH terminal.

As further shown in FIG. 1E, and by reference number 155, the sensor device 105 may determine whether the first fiber cable or the second fiber cable has an issue based on the second optical signal with data. For example, the sensor device 105 may determine whether the first fiber cable, the second fiber cable, and/or the ultra-long-haul transport network has any issues based on the second optical signal with data. The signal detection and processing component of the sensor device 105 may detect (using the distributed optical sensing device), the second optical signal with data reflected back from the destination ULH terminal to the sensor device 105, and may compare the second optical signal with data and the first optical signal with data. The sensor device 105 may determine whether the first fiber cable or the second fiber cable has an issue based on comparing the second optical signal with data and the first optical signal with data. For example, if the second optical signal with data is deteriorated compared to the first optical signal with data, the sensor device 105 may determine that the first fiber cable, the second fiber cable, one of the intermediate sites, the destination ULH terminal, and/or the like has an issue (e.g., a partial break in the first fiber cable or the second fiber cable, an optical device issue at one of the intermediate sites, and/or the like).

In some implementations, the sensor device 105 may perform one or more actions based on determining whether the first fiber cable or the second fiber cable has an issue. For example, when performing the one or more actions, the sensor device 105 may identify a location of an issue associated with the first fiber cable or the second fiber cable and may provide an alert associated with the location of the issue. In another example, when performing the one or more actions, the sensor device may identify an issue associated with the first fiber cable or the second fiber cable at one of the intermediate sites, and may provide an alert associated with the one of the intermediate sites.

Figure 1F:
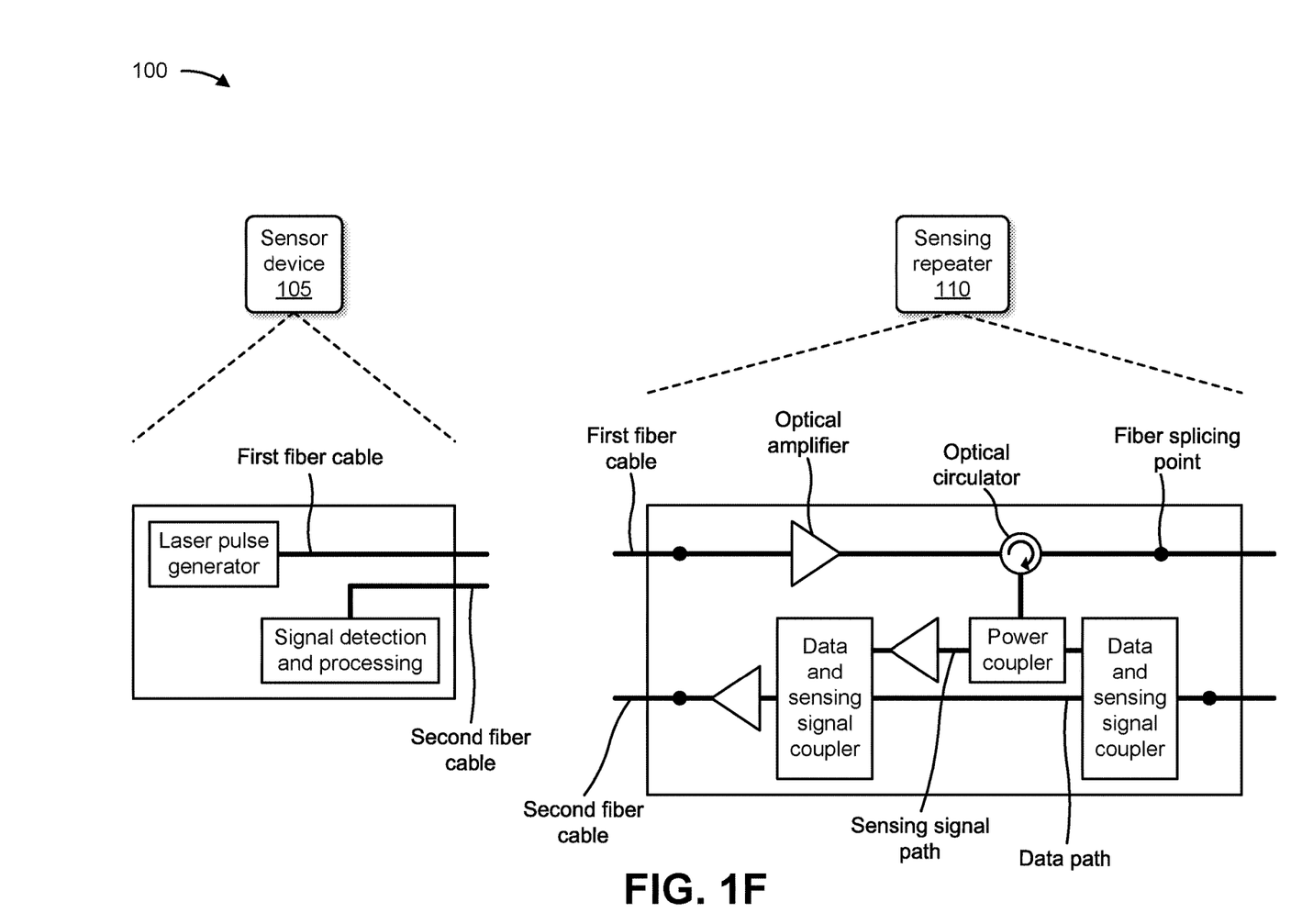

FIG. 1F depicts components of the sensor device 105 and components of the sensing repeater 110. As shown, the sensor device 105 may include the laser pulse generator and the signal detection and processing component. The laser pulse generator may be associated with the first fiber cable and may include the features described above in connection with FIG. 1B. The signal detection and processing component may be associated with the second fiber cable and may include the features described above in connection with FIG. 1B.

The sensing repeater 110 may include a first optical amplifier and an optical circulator associated with the first fiber cable, and may include two data and sensing signal couplers, a power coupler, a second optical amplifier, and a third optical amplifier associated with the second fiber cable. The first optical amplifier may be configured to receive, via the first fiber cable, the first optical signal with data generated by the sensor device 105 provided at the origination ULH terminal of the ultra-long-haul transport network and destined for the destination ULH terminal of the ultra-long-haul transport network. The first optical amplifier may also be configured to amplify the first optical signal with data. The optical circulator may be configured to receive the amplified first optical signal with data and provide the amplified first optical signal with data toward the destination ULH terminal.

The first data and sensing signal coupler may receive, via the second fiber cable, the second optical signal with data, and may split the second optical signal with data into a sensing signal path and a data path. The power coupler may be configured to receive, via the sensing signal path, the second optical signal provided by the destination ULH terminal, and to receive a portion of the amplified first optical signal with data from the optical circulator. The power coupler may also be configured to utilize the portion of the amplified first optical signal to modify the second optical signal. The second optical amplifier may be configured to receive the modified second optical signal, and amplify the modified second optical signal to generate an amplified second optical signal. The second optical amplifier may also be configured to provide the amplified second optical signal to the second data and sensing signal coupler. The second data and sensing signal coupler may receive the amplified second optical signal and the data path, and may combine the amplified second optical signal and the data path to generate the second optical signal with data. The second data sensing signal coupler may provide the second optical signal with data to the third optical amplifier, which may amplify the second optical signal with data and provide the amplified second optical signal with data toward the sensor device 105.

In this way, the sensor device provides distributed fiber sensing for ultra-long-haul transport networks. For example, the sensor device may be associated with a ULH transport fiber cable, which may contain many fiber spans. The sensor device may provide a transmission signal to a destination terminal, via the ULH transport fiber cable and multiple sensing repeaters provided at intermediate sites of an ultra-long-haul fiber network. The sensing repeaters may be much more cost effective as compared to fiber sensing equipment, and may provide the transmission signal to the destination terminal. The sensing repeaters may receive a sensing signal in response to the transmission signal, may compensate for loss of the sensing signal, and may provide the sensing signal back to the sensor device. The sensor device may determine whether the ULH transport fiber cable has an issue based on the second optical signal. Thus, the sensor device may conserve computing resources, networking resources, and/or other resources that would have otherwise been consumed by requiring fiber sensing equipment for each segment of the ultra-long-haul fiber network, managing the large quantity of fiber sensing equipment for the ultra-long-haul fiber network, maintaining the large quantity of fiber sensing equipment for the ultra-long-haul fiber network, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
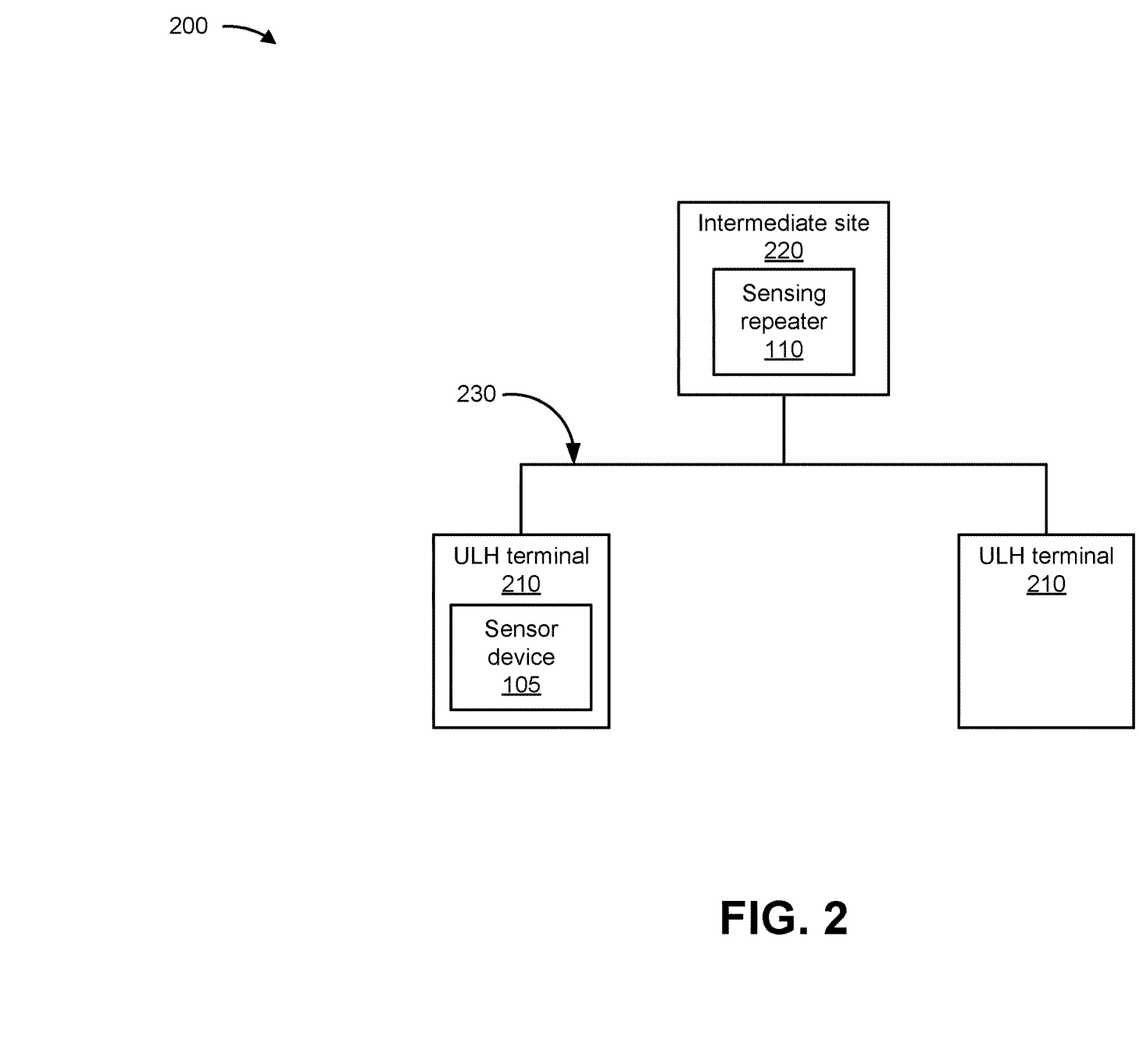
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include ULH terminals 210 (e.g., one of which includes the sensor device 105) and intermediate sites 220 (e.g., with sensing repeaters 110). The ULH terminals 210 may be interconnected via the intermediate sites 220 and fiber cable 230. Devices and/or elements of the environment 200 may interconnect via wired connections and/or wireless connections.

The sensor device 105 may include one or more devices capable of receiving, generating, storing, processing, and/or providing information, such as information described herein. For example, as noted above, the sensor device 105 may include optical components, including a distributed optical fiber sensor device-such as a distributed optical fiber acoustic sensor device that uses a fiber cable to provide distributed strain sensing, where the fiber cable is a sensing element and vibration measurements are made using an optoelectronic device. The distributed optical fiber sensor device may include a Rayleigh scattering-based distributed optical fiber acoustic sensor device. The sensor device 105 may further include an optical reflectometry device, such as an optical time-domain reflectometry (OTDR) device. The optical reflectometry device may be used with the distributed optical sensor device to perform acoustical sensing of vibrations applied to and experienced by a fiber optic cable. The sensor device 105 may also include or be associated with a processing system, such as a laptop computer, a tablet computer, a desktop computer, a handheld computer, or a similar type of device, that determines vibration measurements and fiber cable distances to detected vibrations. In some implementations, the sensor device 105 may receive information from and/or transmit information to the sensing repeaters 110 of the intermediate sites.

The sensing repeater 110 may include one or more devices capable of receiving, generating, storing, processing, and/or providing information, such as information described herein. For example, the sensing repeater 110 may include a device used in a fiber-optic communications system to regenerate an optical signal. The sensing repeater 110 may extend a reach of optical communications links by overcoming loss due to attenuation of an optical fiber. The sensing repeater 110 may correct for distortion of the optical signal by converting the optical signal to an electrical signal, processing the electrical signal, and retransmitting an optical signal. In some implementations, the sensing repeater 110 may just reamplify a data pulse, may reamplify the data pulse and may perform pulse reshaping on the data pulse, or may reamplify the data pulse, may perform pulse reshaping on the data pulse, and may perform retiming of the data pulse.

The ULH terminal 210 may include one or more devices capable of receiving, generating, storing, processing, and/or providing information in a manner described herein. For example, in the context of telecommunications, the ULH terminal 210 is a device which begins or ends a telecommunications link and is a point at which a signal enters or leaves a network, such as an optical network. In some implementations, the ULH terminal 210 may include a network device, such as a label switching router (LSR), a label edge router (LER), an ingress router, an egress router, a provider router (e.g., a provider edge router or a provider core router), a virtual router, or another type of router. Additionally, or alternatively, the ULH terminal 210 may include a gateway, a switch, a firewall, a hub, a bridge, a reverse proxy, a server (e.g., a proxy server, a cloud server, or a data center server), a load balancer, and/or a similar device. In some implementations, the ULH terminal 210 may be a physical device implemented within a housing, such as a chassis. In some implementations, a group of the ULH terminals 210 may be a group of data center nodes that are used to route traffic flow through a network.

The intermediate site 220 may include one or more devices capable of receiving, generating, storing, processing, and/or providing information in a manner described herein. For example, in the context of telecommunications, the intermediate site 220 is a device which is an intermediary of a telecommunications link and is a point at which a signal is received and forwarded on in a network, such as an optical network. In some implementations, the intermediate site 220 may include a network device, such as an LSR, an LER, an ingress router, an egress router, a provider router (e.g., a provider edge router or a provider core router), a virtual router, or another type of router. Additionally, or alternatively, the intermediate site 220 may include a gateway, a switch, a firewall, a hub, a bridge, a reverse proxy, a server (e.g., a proxy server, a cloud server, or a data center server), a load balancer, and/or a similar device. In some implementations, the intermediate site 220 may be a physical device implemented within a housing, such as a chassis. In some implementations, a group of the intermediate sites 220 may be a group of data center nodes that are used to route traffic flow through a network.

The fiber cable 230 may be a fiber optic cable used to carry optical communications traffic in the form of optical signals. The fiber cable 230 may be deployed in a route from an origin location (e.g., a central office or a point of presence) to a destination location (e.g., a different central office or another point of presence). The fiber cable 230 may be deployed underground or above ground (e.g., using poles or other vertical stanchions). The fiber cable 230 may have various small deviations from its deployment route (e.g., to avoid obstacles or comply with property rights), and may include sections that are spooled into "slack" to enable future repairs or improvements.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
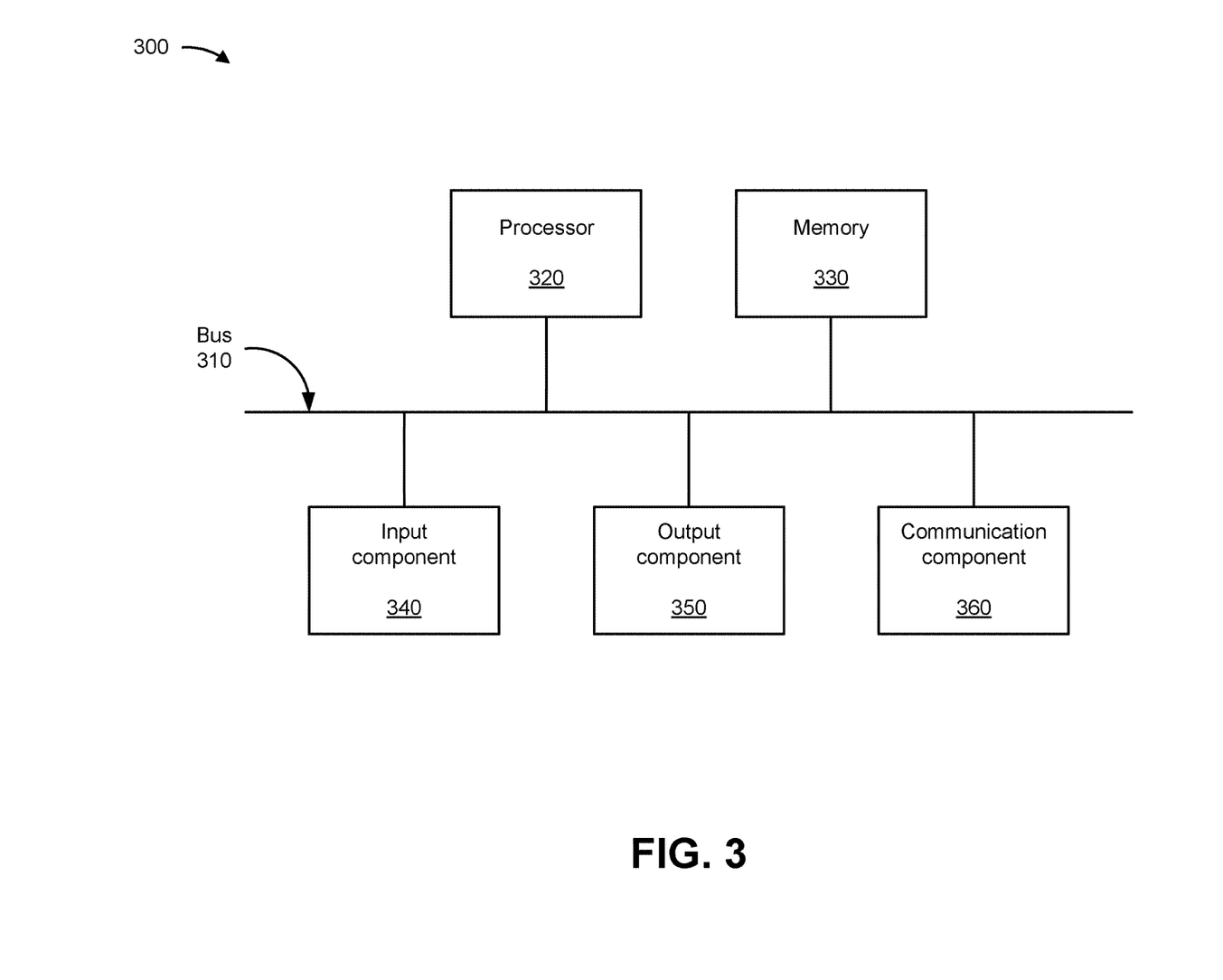
FIG. 3 is a diagram of example components of one or more devices of FIG. 2.

FIG. 3 is a diagram of example components of a device 300, which may correspond to the sensor device 105 and/or the sensing repeater 110. In some implementations, the sensor device 105 and/or the sensing repeater 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
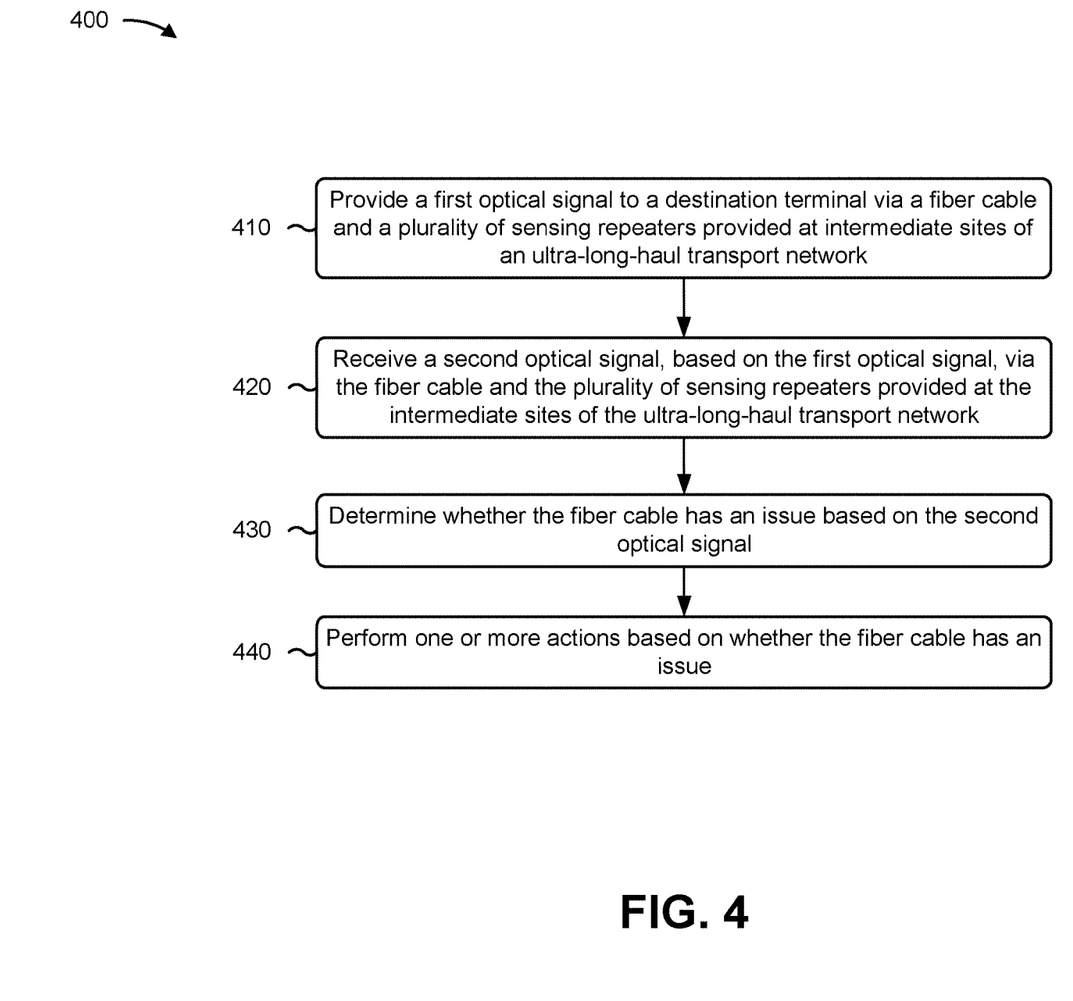
FIG. 4 is a flowchart of an example process for distributed fiber sensing for ultra-long-haul transport networks.

FIG. 4 depicts a flowchart of an example process 400 for distributed fiber sensing for ultra-long-haul transport networks. In some implementations, one or more process blocks of FIG. 4 may be performed by a device (e.g., the sensor device 105). In some implementations, one or more process blocks of FIG. 4 may be performed by another device or a group of devices separate from or including the device, such as a sensing repeater (e.g., the sensing repeater 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a first optical signal to a destination terminal via a fiber cable and a plurality of sensing repeaters provided at intermediate sites of an ultra-long-haul transport network (block 410). For example, the device may provide a first optical signal to a destination terminal via a fiber cable and a plurality of sensing repeaters provided at intermediate sites of an ultra-long-haul transport network, as described above. In some implementations, the device is provided in an origination terminal of the ultra-long-haul transport network.

As further shown in FIG. 4, process 400 may include receiving a second optical signal, based on the first optical signal, via the fiber cable and the plurality of sensing repeaters provided at the intermediate sites of the ultra-long-haul transport network (block 420). For example, the device may receive a second optical signal, based on the first optical signal, via the fiber cable and the plurality of sensing repeaters provided at the intermediate sites of the ultra-long-haul transport network, as described above.

As further shown in FIG. 4, process 400 may include determining whether the fiber cable has an issue based on the second optical signal (block 430). For example, the device may determine whether the fiber cable has an issue based on the second optical signal, as described above. In some implementations, the device includes a laser pulse generator configured to generate the first optical signal, a signal detection and processing component configured to determine whether the fiber cable has an issue, and an optical circulator configured to provide the first optical signal to the destination terminal, receive the second optical signal, and provide the second optical signal to the signal detection and processing component.

As further shown in FIG. 4, process 400 may include performing one or more actions based on whether the fiber cable has an issue (block 440). For example, the device may perform one or more actions based on whether the fiber cable has an issue, as described above.

In some implementations, process 400 includes providing a third optical signal to the destination terminal via a first fiber cable and the plurality of sensing repeaters provided at the intermediate sites of the ultra-long-haul transport network; receiving a fourth optical signal, based on the third optical signal, via a second fiber cable and the plurality of sensing repeaters provided at the intermediate sites of the ultra-long-haul transport network; determining whether the first fiber cable or the second fiber cable has an issue based on the fourth optical signal; and performing one or more additional actions based on whether the first fiber cable or the second fiber cable has an issue. In some implementations, the device includes a laser pulse generator configured to generate the third optical signal, and a signal detection and processing component configured to determine whether the first fiber cable or the second fiber cable has an issue.

In some implementations, process 400 includes providing a third optical signal with data to the destination terminal via a first fiber cable and the plurality of sensing repeaters provided at the intermediate sites of the ultra-long-haul transport network, receiving a fourth optical signal with data, based on the third optical signal, via a second fiber cable and the plurality of sensing repeaters provided at the intermediate sites of the ultra-long-haul transport network, determining whether the first fiber cable or the second fiber cable has an issue based on the fourth optical signal with data, and performing one or more additional actions based on whether the first fiber cable or the second fiber cable has an issue. In some implementations, the device includes a laser pulse generator configured to generate the third optical signal, and a signal detection and processing component configured to determine whether the first fiber cable or the second fiber cable has an issue.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    providing, by a device, a first optical signal to a destination terminal via a first fiber cable and a plurality of sensing repeaters provided at intermediate sites of an ultra-long-haul transport network;
    receiving, by the device, a second optical signal, based on the first optical signal, via a second fiber cable and via the plurality of sensing repeaters provided at the intermediate sites of the ultra-long-haul transport network, the second optical signal modified at one or more of the intermediate sites using at least a portion of the first optical signal;
    determining, by the device, whether the first fiber cable or the second fiber cable has an issue based on the second optical signal; and
    performing, by the device, one or more actions based on whether the first fiber cable or the second fiber cable has the issue.

2. The method of claim 1, further comprising:
    providing the first optical signal to the destination terminal via the first fiber cable and the plurality of sensing repeaters provided at the intermediate sites of the ultra-long-haul transport network; and
    receiving the second optical signal, based on the first optical signal, via the second fiber cable and the plurality of sensing repeaters provided at the intermediate sites of the ultra-long-haul transport network.

3. The method of claim 2,
    wherein the device includes:
        a laser pulse generator configured to generate the first optical signal, and
        a signal detection and processing component configured to determine whether the first fiber cable or the second fiber cable has the issue.

4. The method of claim 1, further comprising:
    providing the first optical signal with data to the destination terminal via the first fiber cable and the plurality of sensing repeaters provided at the intermediate sites of the ultra-long-haul transport network; and
    receiving the second optical signal with data, based on the first optical signal, via the second fiber cable and the plurality of sensing repeaters provided at the intermediate sites of the ultra-long-haul transport network.

5. The method of claim 4,
wherein the device includes:
   a laser pulse generator configured to generate the first optical signal, and
   a signal detection and processing component configured to determine whether the first fiber cable or the second fiber cable has the issue.

6. The method of claim 1,
wherein the device includes:
   a laser pulse generator configured to generate the first optical signal,
   a signal detection and processing component configured to determine whether the first fiber cable or the second fiber cable has the issue, and
   an optical circulator configured to provide the first optical signal to the destination terminal, receive the second optical signal, and provide the second optical signal to the signal detection and processing component.

7. The method of claim 1,
wherein the device is provided in an origination terminal of the ultra-long-haul transport network.

8. A sensor device, comprising:
a laser pulse generator configured to:
   generate a first optical signal, and
   provide the first optical signal to a destination terminal via a first fiber cable and a plurality of sensing repeaters provided at intermediate sites of an ultra-long-haul transport network; and
a signal detection and processing component configured to:
   receive a second optical signal, based on the first optical signal, via a second fiber cable and via the plurality of sensing repeaters provided at the intermediate sites of the ultra-long-haul transport network, the second optical signal modified at one or more of the intermediate sites using at least a portion of the first optical signal,
   determine whether the first fiber cable or the second fiber cable has an issue based on the second optical signal, and
   perform one or more actions based on whether the first fiber cable or the second fiber cable has an issue.

9. The sensor device of claim 8,
wherein the laser pulse generator is further configured to:
   provide the first optical signal to the destination terminal via the first fiber cable and the plurality of sensing repeaters provided at the intermediate sites of the ultra-long-haul transport network; and
wherein the signal detection and processing component is further configured to:
   receive the second optical signal, based on the first optical signal, via the second fiber cable and the plurality of sensing repeaters provided at the intermediate sites of the ultra-long-haul transport network.

10. The sensor device of claim 8,
wherein the laser pulse generator is further configured to:
   provide the first optical signal with data to the destination terminal via the first fiber cable and the plurality of sensing repeaters provided at the intermediate sites of the ultra-long-haul transport network; and
wherein the signal detection and processing component is further configured to:
   receive the second optical signal with data, based on the first optical signal, via the second fiber cable and the plurality of sensing repeaters provided at the intermediate sites of the ultra-long-haul transport network.

11. The sensor device of claim 8,
wherein the sensor device further comprises:
   an optical circulator configured to provide the first optical signal to the destination terminal, receive the second optical signal, and provide the second optical signal to the signal detection and processing component.

12. The sensor device of claim 8,
wherein the sensor device is provided in an origination terminal of the ultra-long-haul transport network.

13. The sensor device of claim 8, wherein, to perform the one or more actions, the signal detection and processing component is configured to:
   identify a location of an issue associated with the first fiber cable or the second fiber cable; and
   provide an alert associated with the location of the issue.

14. The sensor device of claim 8, wherein, to perform the one or more actions, the signal detection and processing component is configured to:
   identify an issue associated with the first fiber cable or the second fiber cable at one of the intermediate sites; and
   provide an alert associated with the one of the intermediate sites.

15. A sensing repeater provided at one of a plurality of intermediate sites of an ultra-long-haul transport network, the sensing repeater comprising:
   a first optical amplifier configured to:
      receive, via a first fiber cable, a first optical signal generated by a sensor device provided at a first terminal of the ultra-long-haul transport network and destined for a second terminal of the ultra-long-haul transport network, and
      amplify the first optical signal;
   an optical circulator configured to receive the amplified first optical signal and provide the amplified first optical signal toward the second terminal;
   a power coupler configured to:
      receive, via a second fiber cable, a second optical signal provided by the second terminal,
      receive a portion of the amplified first optical signal from the optical circulator, and
      utilize the portion of the amplified first optical signal to modify the second optical signal; and
   a second optical amplifier configured to:
      receive the modified second optical signal,
      amplify the modified second optical signal to generate an amplified second optical signal, and
      provide the amplified second optical signal to the sensor device.

16. The sensing repeater of claim 15, further comprising:
a first signal coupler configured to:
   receive the second optical signal provided by the second terminal,
   divide the second optical signal into a data path and a sensing signal path,
   provide the data path of the second optical signal to a second signal coupler, and
   provide the sensing signal path of the second optical signal to the power coupler; and
the second signal coupler configured to:
   receive the data path of the second optical signal from the first signal coupler, receive the sensing signal path of the second optical signal from the power coupler, the amplified second optical signal on the sensing signal path,
combine the data path of the second optical signal and the sensing signal path of the second optical signal.

17. The sensing repeater of claim 15,
wherein each of the first optical signal and the second optical signal includes data generated by the first terminal of the ultra-long-haul transport network.

18. The sensing repeater of claim 15,
wherein additional sensing repeaters are provided at the plurality of intermediate sites of the ultra-long-haul transport network.

19. The sensing repeater of claim 15,
wherein the sensor device is configured to:
determine whether the first fiber cable or the second fiber cable has an issue based on the amplified second optical signal, and
perform one or more actions based on whether the first fiber cable or the second fiber cable has an issue.

20. The sensing repeater of claim 15,
wherein the sensing repeater compensates for signal loss associated with the second optical signal.

* * * * *